A. A. MOHR.
VEHICLE TIRE.
APPLICATION FILED JULY 13, 1915.
1,168,022.
Patented Jan. 11, 1916.
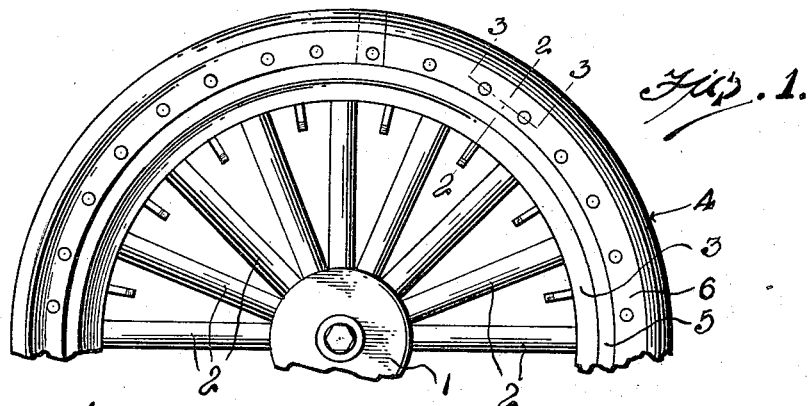
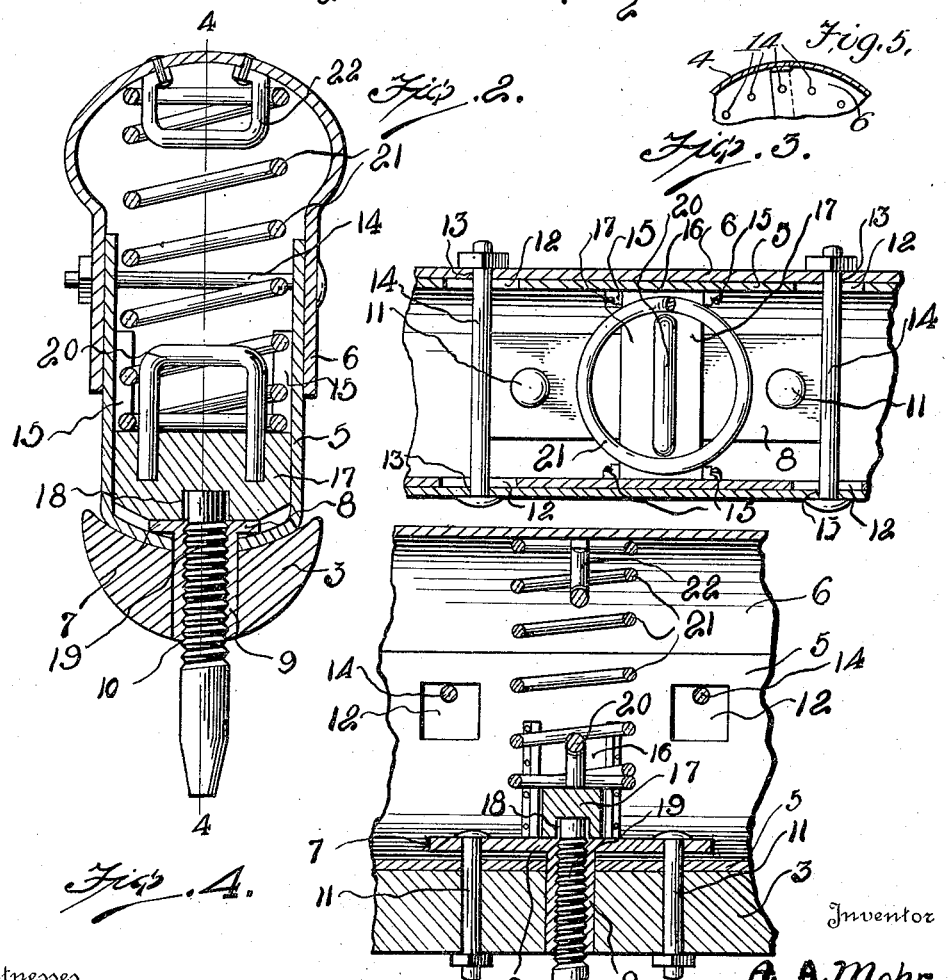
Witnesses
Inventor
A. A. Mohr.
By
Attorneys

UNITED STATES PATENT OFFICE.

ALWIN A. MOHR, OF RED BUD, ILLINOIS.

VEHICLE-TIRE.

1,168,022.  Specification of Letters Patent.  Patented Jan. 11, 1916.

Application filed July 13, 1915. Serial No. 39,659.

*To all whom it may concern:*

Be it known that I, ALWIN A. MOHR, a citizen of the United States, residing at Red Bud, in the county of Randolph, State of Illinois, have invented certain new and useful Improvements in Vehicle-Tires; and I do hereby declare the following to be a full, clear, and exact description of the invention, such as will enable others skilled in the art to which it appertains to make and use the same.

The present invention is directed to improvements in vehicles tires, and has for its object to provide a device of this character having the characteristics of a pneumatic tire, but at the same time to obviate the objections incident to the use of a pneumatic tire.

A further object of the invention is to provide a tire constructed of metal so as to withstand hard usage and to eliminate the objections of punctures or blowouts which frequently occur when pneumatic tires are employed.

A still further object of the invention is to provide a tire of this nature constructed in such a manner that the same can be easily applied to a wheel provided with a conventional form of rim.

With these and other objects in view, this invention resides in the novel features of construction, formation, combination and arangement of parts to be hereinafter more fully described, claimed and illustrated in the accompanying drawing, in which:—

Figure 1 is a fragmentary side elevation of a wheel equipped with the tire. Fig. 2 is a sectional view on line 2—2 of Fig. 1. Fig. 3 is a similar view on line 3—3 of Fig. 1. Fig. 4 is a similar view on line 4—4 of Fig. 2. Fig. 5 is a fragmentary longitudinal sectional view through the tire.

Referring to the drawing 1 indicates the hub of the wheel, which has radiating therefrom spokes 2 for supporting, in the usual manner, the rim 3.

The tire 4 consists of inner and outer sections 5 and 6, respectively, the inner section being formed from suitable sheet metal, and is U-shaped in cross section so that the bight portion thereof will fit snugly in the groove of the rim 3. Anchors 7 are provided, and consist of heads 8 and tubular interiorly threaded shanks 9, which extend through openings 10 formed in the rim 3, said heads being connected to the section 5 by bolts 11.

The outer section 6 has its sides slidably engaged with the outer surfaces of the sides of the section 5. The section 5 has its sides provided with rectangular openings 12, which are adapted to register with perforations 13 formed in the sides of the section 6. Transverse bolts are engaged in the registered perforations and openings, said bolts being indicated by the numerals 14.

The inner surfaces of the sides of the section 5 are provided with a plurality of spaced pairs of ribs 15 so as to provide guides 16. Having their ends engaged in the guides 16 are blocks 17, said blocks being provided with sockets 18 which are engaged by the outer ends of the bolts 19, said bolts being threaded in the tubular shanks 9, the purpose of which will appear later. Fixed to the blocks 17 are loops 20 which are encircled by the inner ends of the coil springs 21, the outer ends of which encircle the lugs 22 formed interiorly of the section 6, said lugs and loops serving to prevent the ends of the springs from slipping.

It will be obvious that by rotating the bolts 19 that the tension of the springs 21 can be easily regulated, since manipulation of said bolts, as is obvious will move the blocks 17 upwardly or downwardly in the guide 16, as the occasion may require. By providing the rectangular openings 12 it is obvious that the sections 5 and 6 will not only be permitted to telescope, but the section 6 may move slightly circumferentially of the section 5.

The outer section 6 of the tire is formed from sections, which have their adjacent ends arranged in overlapping relation, and are held thus by passing the adjacent bolts 14 therethrough, whereby the device can be conveniently assembled.

What is claimed is:—

In combination with a vehicle wheel rim, of an inner section fixed thereto, an outer section telescopically engaged with the inner section, heads mounted in the inner section and having tubular shanks extending through the rim, guides formed on the sides of the inner section, blocks having their ends slidably engaged in the guides, bolts threaded in the tubular shanks and having their outer ends engaged with the blocks, coil springs having their outer ends engaged with the outer section and their inner ends engaged with the blocks, said bolts being operable to adjust the blocks in the guides to regulate the tension of the springs.

In testimony whereof, I affix my signature, in the presence of two witnesses.

ALWIN A. MOHR.

Witnesses:
HENRY MOHR, Sr.,
JOHN X. SMITH.

Copies of this patent may be obtained for five cents each, by addressing the "Commissioner of Patents, Washington, D. C."